United States Patent [19]

Morris et al.

[11] Patent Number: 4,492,430
[45] Date of Patent: Jan. 8, 1985

[54] SECURITY MIRROR REPLACEABLE FROM PIPE CHASE

[75] Inventors: Earl L. Morris, La Habra Hts.; V. Walter Hafner, Whittier; Ron T. Hahn, Fullerton, all of Calif.

[73] Assignee: Acorn Engineering Company, City of Industry, Calif.

[21] Appl. No.: 455,668

[22] Filed: Jan. 5, 1983

[51] Int. Cl.³ .......................... G02B 7/18; A47G 1/16; E04B 1/38
[52] U.S. Cl. ..................................... 350/631; 350/580; 248/27.1; 248/551; 248/466; 109/51; 52/506
[58] Field of Search ............... 350/288, 580; 248/27.1, 248/551, 466; 109/51, 79; 4/DIG. 15; 52/506

[56] References Cited

U.S. PATENT DOCUMENTS 1,835,042 12/1931 Hammer .............................. 248/551
4,006,572 2/1977 Morris ................................. 248/466

FOREIGN PATENT DOCUMENTS 930615 6/1955 Fed. Rep. of Germany ........ 109/51

Primary Examiner—Jon W. Henry
Attorney, Agent, or Firm—Edgar W. Averill, Jr.

[57] ABSTRACT

A vandal-resistant and tamper-proof security mirror assembly. The mirror is particularly useful for installation in a prison cell and is not removable from the viewing side thereof but is removable and replaceable from the back of the mounting surface such as from a pipe chase. The mirror assembly is held in a pan which is held behind an opening of the mounting surface.

11 Claims, 6 Drawing Figures

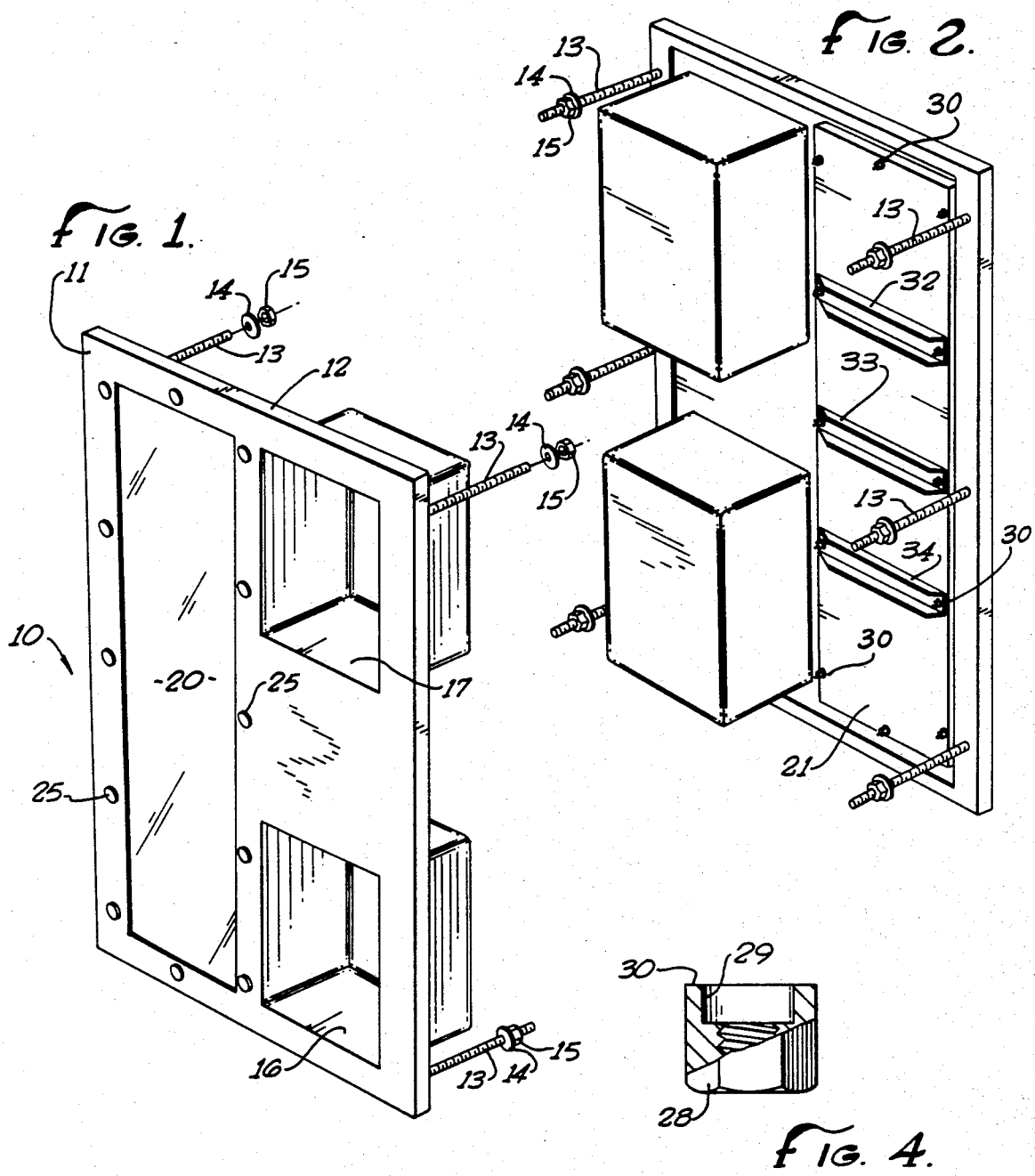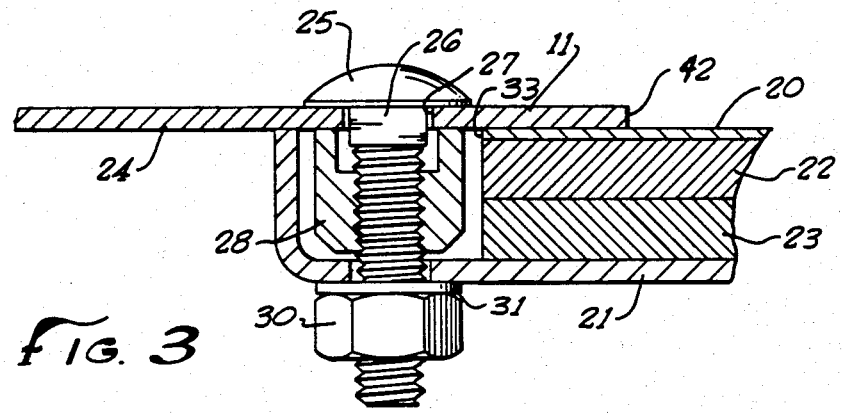

SECURITY MIRROR REPLACEABLE FROM PIPE CHASE

CROSS REFERENCE TO RELATED APPLICATIONS

This application is being filed the same day as the following applications and U.S. patents which are assigned to the assignee of the present application: U.S. Pat. No. 4,434,516 titled Wall Sleeve and Installation Jig for Multiple Adjacent Fixture Mounting; Ser. No. 455,753 titled Vandal Resistant Push Button Electrical Switch Assembly; Ser. No. 455,752 titled Vandal Resistant and Tamper-Proof Plenum or Vacuum Chamber Security Air Flow Adjustment Device; Ser. No. 455,751 Plenum/Vacuum Chamber with Duct Connection for Installation in Cabinet Fixtures to Control Air Supply or Return; U.S. Pat. No. 4,453,202 titled Vandal Resistant Light Fixture; and Ser. No. 455,665 titled Vandal Resistant and Tamper-Proof Multi-Purpose Modular Lavatory/Toilet.

BACKGROUND OF THE DISCLOSURE

The field of the invention is security mirrors of the type used in prison cells and other vandal-prone installations.

Various approaches have been taken to provide mirrors for prison cells, mental institutions and the like, and a widely used type of mirror a has glass or plastic mirror held in a steel frame which is screwed into threaded openings in the wall. Tamper-resistant screws are used to reduce the possibility that the mirror be removed from the wall, but unfortunately such tamper-resistant screws are not tamper proof and removability can create a problem and in some instances even can conceivably result in a safety hazard. A more secure mirror can be made having a stainless steel reflective surface and vandal resistant mirrors have been provided entirely made from stainless steel with a highly polished stainless steel viewing surface. Such one piece stainless steel mirrors have the advantage of being impossible to disassemble, have no glass to be broken and provide a higher level of security than the above-described mirror but such mirrors are mounted from the viewing side of the wall and still can be removed from the wall side and if the mirror becomes scratched or bent, it must be replaced from within the prison cell. It is highly desirable to provide fixtures that can be serviced or replaced from outside of the prison cell. The steps required to provide maintenance service in a prison cell are labor intensive. First, it must be understood that prison guards or security personnel are not permitted to do service or maintenance work. Furthermore, maintenance personnel are not trained or equipped to guard prisoners. Still further, tools which are required to perform maintenance are potentially capable of being used as weapons and it thus becomes necessary for the maintenance personnel to be kept separated from prisoners. Therefore, even for a simple maintenance task it is necessary to first remove the prisoner or prisoners from the cell. Secondly, the maintenance man, accompanied by a security man may enter the cell. A second security may may also be required to escort the maintenance man to the cell door. It can thus be seen that a task as ostensibly simple as changing a light bulb becomes a disruptive and labor intensive task if it must be done from within the cell.

Another design of security mirror is shown in United States Patent No. 4,006,572 assigned to the assignee of the present application. While this mirror provides the requisite security from removal from the front surface, it still does require servicing from the front surface with the above-described disadvantages relating thereto.

There is thus a need for a mirror which cannot be removed from the viewing side and yet one which can be serviced and replaced from the back surface of the viewing side.

SUMMARY OF THE INVENTION

It is an object of the present invention to provide a security mirror which may be serviced and replaced from the back side thereof and which cannot be removed from the front or viewing side.

The present invention is for a vandal-resistant and tamper-proof security mirror assembly with fasteners which are not removable from the viewing side thereof but which are removable and replaceable from the back side of the mounting surface. The mirror assembly has a mounting plate having a viewing side and a back side securely affixed over an access hole in a wall. The mounting plate has an opening therein and fastening means are affixed to the mounting plate along the opening. The fastening means extends away from the back side of the mounting plate and are removable from the back side thereof. Pan means are held by the fastening means over the back side of the opening in the mounting plate. The pan means extend past the edges of the opening and also past the fastening means. The pan means has a side wall which extends completely around it, and the inner edge of the side wall abuts the back surface of the mounting plate at a location further away from the opening than the fastening means. A mirror and backing laminate having a backing layer adjacent the pan means is held against the back side of the opening in the mounting plate and extends beyond the opening in the mounting plate along the entire periphery of the opening. Preferably, the fastening means comprises a plurality of carriage bolts held in a non-turning relationship in the mounting plate. The carriage bolts may be held to the mounting plate by a first nut and a second nut holds the pan against the mounting plate. Preferably the first nut provides spacer means between the pan means and the back of the mounting plate. Still further the spacer nuts can provide a positioning means for the mirror assembly.

BRIEF DESCRIPTION OF THE DRAWINGS

FIG. 1 is a perspective view of the security mirror of the present invention.

FIG. 2 is a perspective view of the back side of the security mirror of FIG. 1.

FIG. 3 is an enlarged cross-sectional view showing the fastening means of the security mirror of FIG. 1.

FIG. 4 is a side view partly broken away of a nut of the fastening means shown in FIG. 3.

DESCRIPTION OF THE PREFERRED EMBODIMENTS

Figure 5:
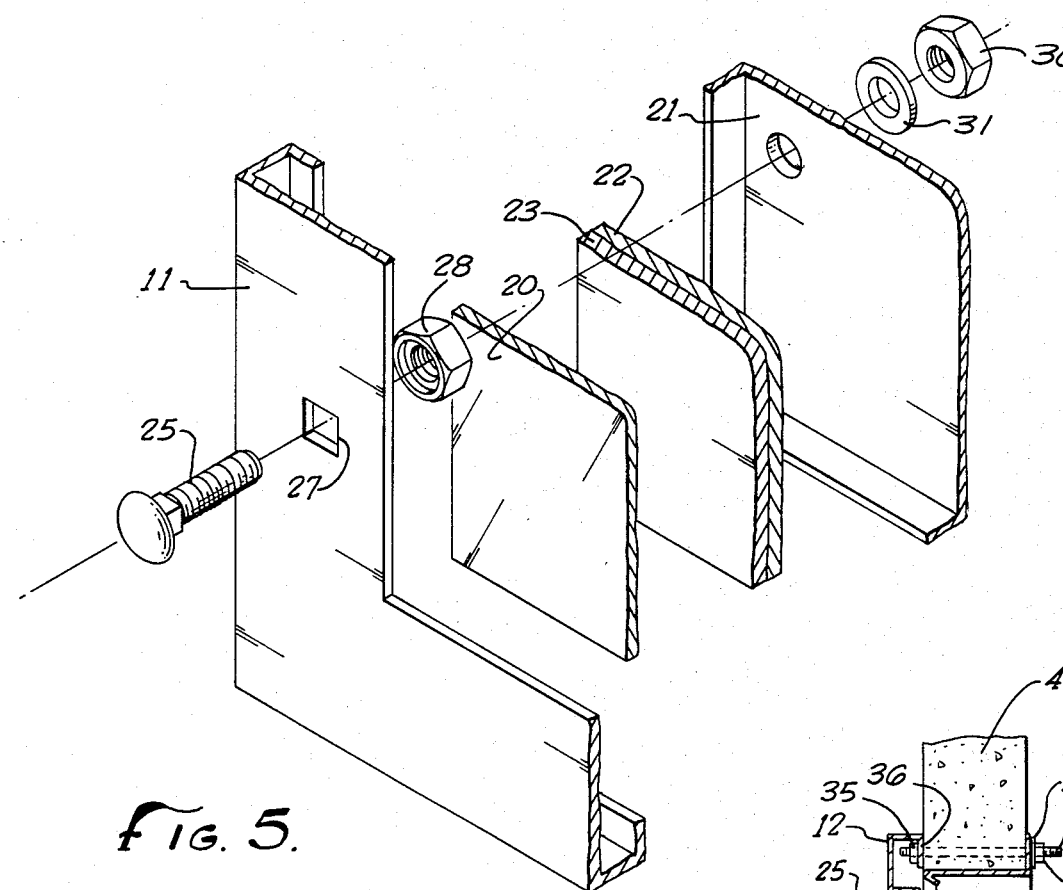
FIG. 5 is an exploded perspective view of the lower left corner of the mirror of FIG. 1.

A security mirror of the present invention is shown in perspective view in FIG. 1 and indicated generally by reference character 10. It is mounted in a mounting plate 11 which is shown as part of a mirror and shelf fixture 12 which may be securely bolted to the wall as described below in reference to FIG. 6. Fixture 12 is adapted to be bolted over an opening in the wall and is held to the wall by four studs 13 held by nuts 15 against washers 14. Fixture 12 may have features such as shelves 16 and 17 and such fixture would be typically placed over a lavatory and be provided with light and other accessories. Fixture 12 is preferably fabricated from steel such as stainless steel of a sufficient gauge to prevent destruction by vandalism. Stainless type 304, of 14 gauge has proved satisfactory for this application. The mirror 20 is held securely against the back side of mounting plate 11 and is supported in a pan 21 which is shown in FIG. 2 and also in cross-section in FIG. 3. Pan 21 is also fabricated from steel but need not be stainless steel since it is not exposed to the viewing side of the mirror. Pan 21 is accessible through an opening in wall 43 shown in FIG. 6. An important feature of the present invention is the ability to remove and replace mirror 20 from the back side 44 of wall 43. In prison installations, the prison cell is adjacent a passageway referred to as a pipe chase which is typically a narrow corridor behind a row of prison cells. The plumbing and electrical service is contained in the pipe chase and the chase is accessible to service personnel but is not accessible from the cell. In this way by providing the ability to service the utilities and the mirror from the back side 24 and thus outside of the cell, the above-referenced labor intensive steps are unnecessary.

Turning now to the details of the construction and mounting of the mirror, the mirror 20 is shown in cross-sectional enlarged view in FIG. 3. Mirror 20 may be fabricated from glass, plastic or highly polished metal. Highly polished stainless steel provides maximum security since it is unbreakable. Type 400 stainless steel is polished to a mirror finish and provides a satisfactory reflective surface. Care should be taken in cleaning the mirror, however as abrasive cleaners can damage the surface.

Another security type of mirror is made from ¼ inch thick tempered glass. Tempered glass has four to five times the strength of comparable plate glass and is extremely difficult to break. If the glass is broken, the mirror will crumble into small harmless crystal rather than dangerous sharp pieces. Reflective qualities of tempered glass are equivalent to plate glass although subject to minor imperfections under some light conditions due to tempering. Such surface, being glass, is highly scratch resistant and easy to clean.

Another type of mirror useful with the assembly of the present invention is made from an acrylic polymer such as that sold under the trademark Plexiglass. A polymeric sheet of ¼ inch Plexiglass can be used and provides a virtually unbreakable surface. Reflective qualities are excellent but, of course, the surface is subject to scratching.

In FIG. 3, mirror 20 is indicated as a stainless steel mirror with two ¼ inch thick fiberboard backing layers 22 and 23. In the event the mirror does become broken or scratched and must be replaced, pan 21 is removed and the fiberboard backing unit is replaced only if necessary and the mirror surface can then be replaced and the pan reassembled against the mounting plate 11.

Preferably the mirror backing and pan assembly is held to the back surface 24 of plate 11 by a plurality of carriage bolts 25 each of which has a square shank 26 which fits into a square opening 27 in mounting plate 11. Bolt 25 is held to plate 11 by a nut 28 shown partly broken away in FIG. 4. Nut 28 may be fabricated from an easily machinable material such as =ASTM B-16 free cutting brass hex stock. A cylindrical recess 29 is formed adjacent the bearing surface 30 to permit entry of square shank 26 of bolt 25. Nut 28 thus can be seen to securely hold bolt 25 in mounting plate 11 and the fit of square shank 26 in square opening 27 prohibits the turning of bolt 25 and makes it impossible to remove the bolt from the viewing side of the mirror. Nut 28 also serves as a means to prevent over tightening. By fabricating nut 28 to a thickness slightly less than the distance between the back surface 24 of mounting plate 11, and the inner surface of pan 21, it is not possible to damage mirror 20 by over tightening nut 30. This feature also prevents the damage to the front surface of the mounting plate by overtightening which could cause a dimpling of the front surface. When nut 30 is tightened, pan 21 abuts the back surface of spacer nut 28 preventing further compression of the mirror assembly. Nuts 28 also provides a rest for the mirror assembly during installation. Pan 21 is held to the back surface 24 of plate 11 by a plurality of nuts 30 which bear against washers 31. A plurality of channels 32, 33 and 34 provide reinforcing for the back of pan 21 and also facilitate the installation of the pan against the back of fixture 12.

The assembly is also indicated in exploded perspective view in FIG. 5 where pan 21 holds backing layers 22 and 23 against the back of mirror 20. Carriage bolts fit in square openings 27 and are held by nuts 28.

The amount of distance which the mirror 20 extends beyond the edge 42 is important since this disperses the stress along the mirror edge. The distance between edge 32 and edge 33 should be at least ⅜ inches around the entire periphery of the mirror and is peferably about ½ inch. Spacer nuts 28 assure the proper location of the mirror assembly.

For installations where high humidity is anticipated, it is beneficial to add a strip of waterproofing tape about the exterior of the mirror and backing laminate. This strip should cover the edge and extend about ¼ inch over the front and back surface. The pan 21 and the back surface of the mounting plate help hold the tape in place.

Figure 6:
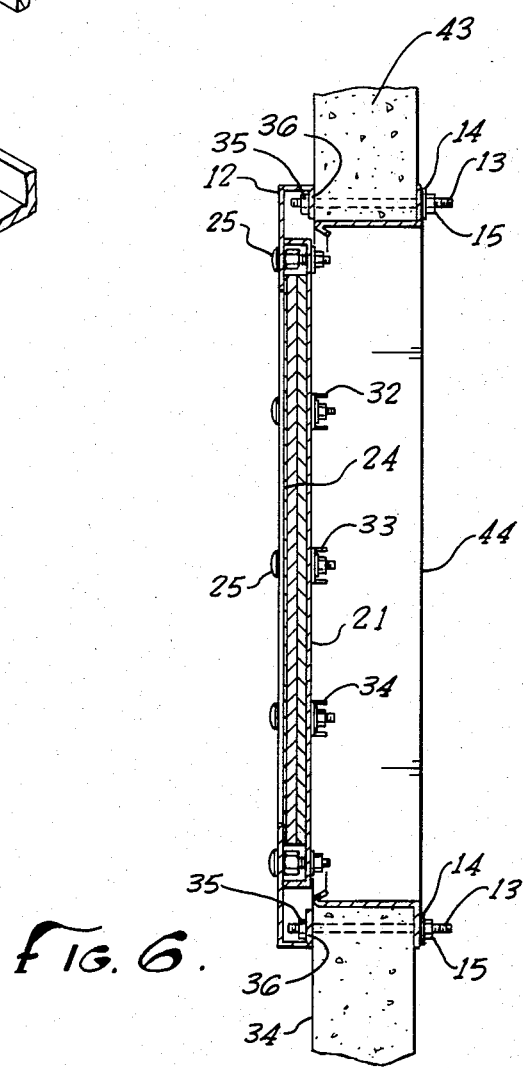
FIG. 6 is a cross-sectional view of the assembly of FIG. 1 bolted to a wall.

To service the mirror, nuts 30 are removed from the back side 24 as indicated best in FIG. 6. After removal of all the nuts, the carriage bolts 25, of course, remain in place being held by nuts 28. A substitute mirror assembly is then lifted back in place and the pan reinstalled. The replacement thus can be made in a matter of minutes and provides a minimum of disruption and service time. It can also be seen clearly in FIG. 6 that the mirror is virtually indestructible from the cell side 34. The fixture unit 12 is held to wall 23 with fasteners comprising studs 13 which are threaded into nuts 35 which are affixed to the flange 36 which extends around the entire periphery of Fixture 12. Washers 14 provide a bearing surface for nuts 15 which are accessible from the pipe chase. Thus, there are no exposed fasteners for the holding of the fixture to the wall and vandalism is virtually impossible with the exception of damage to the reflecting surface itself by scratching or by breakage. This, of course, is difficult. Thus, a highly vandal resistant and yet easily serviceable unit is provided by the assembly of the present invention. While carriage bolts are preferred, other fastening means may be used and the fastener may be welded to the back surface 24 of mounting plate 11.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A vandal-resistant and tamper-proof security mirror assembly with fasteners which are not removable from the viewing side thereof but which are removable and replaceable from the back side of the mounting surface, said mirror assembly comprising:
   a mounting plate, having a viewing side and back side, securely affixed over an access hole in a wall, said mounting plate having an opening therein;
   fastening means affixed to the mounting plate along the opening therein, said fastening means extending away from the back side thereof, said fastening means being removable from the back side of the mounting plate;
   pan means held by said fastening means over the opening in the mounting plate and against the back side thereof, said pan means extending past the edges of the opening along the entire periphery of the opening and said pan means having a side wall extending completely therearound, the inner edge of the side wall abutting the back surface of the mounting plate at a location further away from the opening than the fastening means; and
   a mirror and back laminate having a backing layer adjacent the pan means and a reflective layer held against the back side of the opening in the mounting plate, said mirror and backing laminate extending beyond said opening around the entire periphery thereof.

2. The security mirror assembly of claim 1 wherein said fastening means comprises a plurality of carriage bolts held in a non-turning relationship in the mounting plate.

3. The security mirror assembly of claim 2 wherein each carriage bolt is held to the mounting plate by a nut having a bearing surface abutting the back surface of the mounting plate, said nut being located between the side wall of the pan and the opening in the mounting surface.

4. The security mirror assembly of claim 3 wherein the nuts holding the carriage bolts position the mirror and back laminate within the pan means.

5. The security mirror assembly of claim 1 wherein said fastening means are held to said mounting plate by spacer nut means held against the back side of the mounting plate, said spacer nut means being of a thickness slightly less than the distance between the back of the mounting plate and the inside surface of the pan means whereby over tightening of the pan means against the mirror and back laminate is prevented.

6. The security mirror assembly of claim 5 wherein said fastening means comprises a plurality of carriage bolts and said spacer nut means has a recess to accept a square shank portion of said carriage bolts.

7. The security mirror assembly of claim 1 further including at least one channel member held against the back surface of the pan means.

8. The security mirror assembly of claim 7 wherein there are three channel members.

9. The security mirror assembly of claim 1 wherein said reflective layer is fabricated from tempered glass.

10. The security mirror assembly of claim 1 wherein said reflective layer is fabricated from stainless steel.

11. The security mirror assembly of claim 1 wherein said mirror and reflective laminate extends past the opening in the mounting plate by at least about $\frac{3}{8}$th inch.

* * * * *